April 2, 1968   H. D. HUGHES ET AL   3,376,167
ELECTRICAL PRIMARY CELLS HAVING INDIUM COATING ON ANODE
Filed Nov. 29, 1965
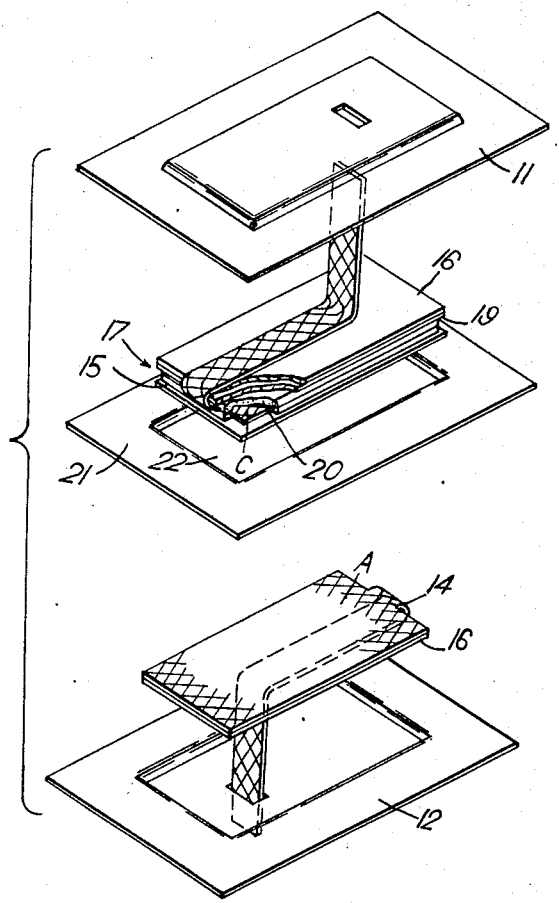
Inventors
Herbert Denis Hughes
Richard Walter Lewis
Alan Hardy Partridge
By
Watson, Cole, Grindle & Watson
Attorneys United States Patent Office 3,376,167
Patented Apr. 2, 1968

3,376,167
ELECTRICAL PRIMARY CELLS HAVING INDIUM COATING ON ANODE
Herbert D. Hughes, Banstead, Richard W. Lewis, East Grinstead, and Alan H. Partridge, Horsham, England, assignors, by mesne assignments, to Burndept Limited
Filed Nov. 29, 1965, Ser. No. 510,254
Claims priority, application Great Britain, Dec. 2, 1964, 48,987/64
10 Claims. (Cl. 136—100)

ABSTRACT OF THE DISCLOSURE

This invention relates to an electric primary cell comprising a hermetically sealed outer casing of flat box-like shape. The anode has an open framework construction and has a coating thereon comprising indium. The coating optionally may contain also bismuth. The cathode has an associated depolarizer and the cell itself contains an alkaline electrolyte. The spacing between the cathode and anode is maintained between 4 and 6 mm.

---

The present invention relates to improvements in electric primary cells, and to batteries comprising a plurality of such cells.

Various systems of electrodes and electrolytes have been proposed for primary cells, but the systems and constructions previously known are liable to produce gas during storage or on discharge and, therefore, it has been necessary to provide a vent of some sort to permit such gas to be evacuated from the cell proper. The provision of such vents necessarily also permits the entry of air to the inside of the cell, which tends to accelerate undesired chemical reactions, and these conditions do not provide the requirements for high stability and storage over long periods.

It has been found that a hermetically sealed primary cell incorporating an anode structure in which the active material is formed at least in part by indium, said cell further comprising a cathode with an associated depolariser and an alkaline electrolyte, requires critical design as regards the proportioning of the surface area of the cathode and anode and the mutual spacing between them if optimum results are to be obtained, and the present invention is particularly directed to these features of the design.

In particular the physical spacing between the anode and cathode should not exceed a predetermined value and the area of the electrodes should be increased according to the current capacity of the cell, without exceeding the predetermined limit of spacing between the electrodes.

In accordance with the present invention an electric primary cell comprises a hermetically sealed outer casing of flat box-like form, an anode structure disposed within said casing and including a coating comprising indium and of openwork formation, a cathode structure with an associated depolariser and an alkaline electrolyte, and in which the spacing between the cathode and anode lies between 4 mm. and 6 mm.

Preferably the anode structure coating consists of indium and bismuth, the indium at least being applied by electro-deposition and the coating may consist of successive coatings of indium and bismuth, the bismuth being applied either by chemical deposition or by electrodeposition, and the proportion of bismuth relatively to indium being above 10% by weight of the active coating and preferably of the order of 13% by weight.

Since the indium and the bismuth may be applied by deposition methods it becomes possible to use a range of materials for the supports; thus, for example, it is possible to use nickel, silver, copper, zinc or stainless steel as the anode support, and this support may moreover be corrugated or crimped to increase the surface area which can be made available for a given overall size. In some cases an insulating support may be used consisting for example of expanded polyvinyl chloride which may be preliminarily coated with a thin layer of copper or silver by chemical deposition before the indium coating is applied by electrodeposition, and the bismuth is applied in any suitable way.

In the preferred arrangement the support may be coated with indium by an electroplating procedure and then bismuth can be deposited on the plated indium by chemical deposition or by electrodeposition, these operations being repeated in alternating sequence.

The volume of the interelectrode spacing, that is the volume of the electrolyte, should be of the order of 1.5 to 2.5 cc. per ampere hour, or more specifically between 1.7 and 2 cc. per ampere hour, a preferred figure being 1.8 cc. per ampere hour. In the design of a cell of this character the anode current density should lie between 3 and 6 milliamps per square cm. and preferably between 3.5 and 5 milliamps per square cm.

The figure is an exploded view of the cell according to the present invention.

One construction of an electric primary cell incorporating electrode structures according to the present invention is shown by way of example on the accompanying drawing, the components of a hermetically sealed cell being shown separated, as if prior to assembly and sealing of the cell.

As shown on the drawing, the cell comprises top and bottom casing sections 11, 12, which may consist of pressed thermoplastic sheet consisting for example of polyvinyl chloride or other suitable alkali-resistant material. Each casing section is formed with a comparatively shallow depression and with an outwardly directed flange.

An anode A and and a cathode C each consist of a support consisting of expanded or perforated metal sheet, such as defined above, or of an expanded plastic coated with a thin layer of conductive material, and each support consists of a portion adapted to fit within the dished part of the casing sections 11 and 12, and a projecting pigtail which is folded back so as to extend along the base of the dished part of the casing section 11 or 12 and to pass outwardly through an aperture near the centre thereof, the projecting part being shown at 14 in the case of the anode and at 15 in the case of the cathode. The part of the projecting pigtail running along the base of the casing section 11 or 12 is covered by means of a strip of thermoplastic material 16 which is welded to the inside of the casing section so as to seal off the aperture in the casing section. The cathode may be formed of any of the metals specified other than copper.

The anode support A is coated by a plating procedure with a major proportion of pure indium and thereafter bismuth is caused to become superficially associated with the indium, both metals being of high purity, and in each case the total of impurities should not exceed 0.1%. The product is of openwork structure, the indium then coating the link bar portions between the openings to give a large indium surface.

The bismuth is coated superficially on the indium following the production of an indium coating on the support, by a deposition process from a bismuth salt solution. Such deposition can be carried out by reduction plating procedures or alternatively by electrodeposition. Whatever process is adopted the plating operations may be repeated several times to produce a sufficient deposit of bismuth. After deposition of the bismuth has been effected a further layer of indium is applied, followed by a further deposition of bismuth and these operations may be repeated several times to build up the required thickness of deposit which may be of the order of .005 to .01".

In preferred methods of producing anode structures according to the present invention successive coatings of indium and bismuth are applied in such manner as to build up an active surface coating containing a proportion of bismuth in excess of 10% of the mass of the whole coating, and this proportion may conveniently be of the order of 13%. Each successive bismuth coating produced as described above results in the production of an extremely thin coating of metallic bismuth on the surface of the indium, this coating being then followed by a further electrodeposited coating of indium, these operations being repeated so as to build up an active anode surface of the required total weight, having regard to the intended capacity of the cell and the proportion of bismuth to be incorporated in the active surface coating. The relatively small proportion of bismuth present in incorporated form with the indium provides improved results in that it prevents polarisation of the anode and thus improves the current output of the cell. If desired the anode is subjected to a heat treatment which results in a firm binding of the bismuth metal into the superficial layer of the indium and such a heat treatment may be effected over the range from 50° C. to 150° C., but such a heat treatment is optional and makes substantially no difference to the operational characteristics of the anode.

In one method of carrying the invention into effect the expanded metal support is first plated electrolytically with pure indium. A suitable plating bath for this purpose contains an indium salt and may, for example, be compounded as follows:

| | Gm. per litre |
|---|---|
| Indium sulphate | 45 |
| Sodium sulphate | 10 |

The current density during plating should not exceed 5–10 amps per square foot of surface and the coating thickness is of the order of .008″. The amount of indium deposited amounts to between 1.8 and 2 gm. for each 1 ampere hour capacity of the cell.

The indium-plated metal support is then immersed in an aqueous solution of a bismuth salt. For instance the plated electrode may be immersed for 5 sec. in a solution of bismuth chloride containing 5 gm. per litre of bismuth. The electrode is then washed and dried at 50° C. An electrode produced in this way contains a bismuth percentage of 0.2 to 0.5% for an electrode of 1 ampere hour capacity.

Preferably, however, a relatively thin electrodeposited coating of pure indium is treated in a bismuth salt, as indicated above, and thereafter a further coating of indium is applied in the same way, followed by a further treatment in an aqueous solution of a bismuth salt, these operations being repeated in sequence until the required total mass of the indium bismuth composition has been formed upon the anode support, and the proportion of bismuth in the composition is above 10% and preferably of the order of 13%.

In accordance with another method of carrying the invention into effect an expanded metal support is plated electrolytically with pure indium as explained above and is thereafter plated electrolytically with pure bismuth. For this purpose the indium plated anode support is inserted in a bismuth plating bath which is compounded as follows:

| | Per litre |
|---|---|
| Bismuth oxycarbonate | grams 125 |
| Ammonia | ml 150 |
| Ethylenediaminetetraacetic acid | grams 185 |
| Ethylenediamine | ml 110 |

The current density during plating is 12 to 15 amps per square foot of surface.

As stated above the various operations for producing coatings of indium and bismuth may be repeated several times in alternating sequence. After treatment in the bismuth plating solution the electrode may be washed and then returned to the indium plating bath to apply a further coating of indium, which may then be followed by bismuth deposition and so on, and these various operations may be performed without intermediate drying of the electrode. When a deposit of sufficient thickness has been attained the electrode may be washed and dried at a temperature ranging between 50° and 150° C.

The casing sections 11 and 12 are arranged to include the cathode and anode assemblies respectively in the sections 11 and 12 and adapted to be hermetically sealed so as to include the electrode structures and an alkaline electrolyte preferably consisting of a 30% to 50% caustic potash solution.

The cell structure is so designed that the physical spacing between the anode A and the cathode C does not exceed a predetermined figure, which in the constructional example given above is of the order of 4 mm. but may range between 3 and 6 mm. in appropriate circumstances.

The total volume of electrolyte required is dependent on the capacity of the cell and thus the superficial area of the anode and cathode structures will vary according to the capacity of the cell. Preferably the said volume should be of the order of 1.8 cc. per ampere hour, although it may range between 1.5 and 2.5 cc. per ampere hour.

If such a cell is to give its maximum capacity the anode current density should not exceed 6 milliamps per square cm. and should be of the order of 3.5 to 5 milliamps per square cm. If these design factors are adhered to, satisfactory operation of the cell under practical conditions is ensured. The precise reasons why these proportions should be adhered to are not clearly understood, but it is believed that these proportions permit the products of decomposition of the anode structure to be adequately absorbed into the electrolyte during the operation of the cell without forming gel-like products such as would increase the internal resistance to an extent such as to reduce the output current to a small and practically useless value.

The casing section 11 serves to accommodate the cathode assembly C indicated generally at 17. This assembly comprises the perforated or expanded metal support and a mass or pellet of depolariser 18 consisting of the following mixture (by weight parts):

| | |
|---|---|
| Mercuric oxide | 92 |
| Graphite | 4 |
| Carbon black | 4 |

The mercuric oxide may be replaced by other oxidising agents such as manganese peroxide. It may be formed into a stiff paste with distilled water and then applied as a pellet on the metal support. It may be about 1.25 mm. thick and proportioned so that 4 gm. is available for each 1 ampere hour capacity. The cathode and the pellet are laid upon a sheet of this polythene 19 treated at least at its edges to render it adhesive and a sheet of fibre fabric 20 is laid over the pellet, the edges being brought into contact with the edges of the polythene sheet and held in contact therewith by the adhesive property thereof. The fibre fabric referred to is a commercial product which consists of rayon fibres bonded with viscose and is a paper-like material. It may if desired be replaced by an alkali resistant paper such as a suitable grade of filter paper.

The cathode assembly so formed is placed in or formed into the upper casing section 11 and the two sections 11 and 12 supporting the cathode assembly 17 and the anode A can then be assembled with the interposition of a gasket or filler 21 consisting of a piece of highly plasticised polyvinyl chloride having a square window aperture therein into which a membrane 22 consisting of alkali-resistant material, such as a suitable grade of filter paper or porous polyvinyl chloride has been attached, for example by plastic welding processes. This material 22 has the purpose of preventing migration of mercury (or other reduced metal) from the depolariser mass towards the anode.

It will, of course, be understood that the finished cell is very compact since the cathode assembly 17 is pressed into the casing section 11 during the assembly operations. The next stage is the application of heat and pressure to the superposed flanges of the two casing sections 11 and 12, to form a fluid-tight and hermetically sealed assembly, migration of the plasticiser from the membrane 21 permitting the flanges to be satisfactorily welded together. This may be performed by high frequency welding techniques.

In order to permit filling with electrolyte, it is preferred to adopt a vacuum filling technique, and for this purpose in the course of assembly of the cell a duct is formed in the superposed flanges, for example by placing a piece of wire between the flanges when they are being sealed under heat and pressure, the wire being later withdrawn. If the cell is then treated in a vacuum chamber, immersed in electrolyte, and the surrounding pressure restored to the normal value, the cell will become substantially filled with the electrolyte, after which the duct can be sealed off by a further application of pressure. Finally, the superposed flanges are trimmed.

An electrode system of this character and using such an indium-bismuth electrode with an aqueous solution of potassium hydroxide as the electrolyte, has an E.M.F. of about 1.16 volts and, moreover, has the advantage of long-term stability, i.e. it provides a battery which can be stored for lengthy periods without danger of deterioration during storage and which is ready for immediate use whenever required.

What we claim is:

1. An electric primary cell comprising a hermetically sealed outer casing of flat box-like form, an anode structure disposed within said casing and including a coating comprising indium and of openwork formation, a cathode structure with an associated depolariser and an alkaline electrolyte, and in which the spacing between the cathode and anode lies between 4 mm. and 6 mm.

2. An electric primary cell, comprising a hermetically sealed flat box-like outer casing, a planar openwork metallic structure having a coating of indium and bismuth on said structure to serve as an anode, an oppositely disposed second planar openwork structure, a depolariser material associated with said second planar structure, said structure serving as a cathode and being disposed substantially parallel to the anode, the spacing between said anode and said cathode lying between 4 and 6 mm., and an alkaline electrolyte disposed within said casing between said anode and said cathode.

3. An electric primary cell according to claim 2, wherein the superficial area of the anode and cathode are dependent on the current capacity of the cell.

4. An electric primary cell according to claim 2, wherein the volume of the electrolyte is dependent on the current capacity of the cell and lies between 1.5 and 2.5 cc. per ampere hour of capacity.

5. An electric primary cell according to claim 4, wherein the volume of electrolyte lies between 1.7 and 2.2 cc. per ampere hour of capacity.

6. An electric primary cell according to claim 4, wherein the volume of the electrolyte is 1.8 cc. per ampere hour of capacity.

7. An electric primary cell according to claim 2, wherein the proportion of bismuth relatively to indium in the active surface coating of the anode is above 10% weight for weight of the active coating.

8. An electric primary cell according to claim 2, wherein the proportion of bismuth relatively to indium in the active surface coating is 13% weight for weight of the active coating.

9. An electric primary cell according to claim 2, wherein the hermetic outer casing consists of two shell-like members hermetically sealed about projecting edge flanges and in which the two openwork structures are fitted respectively into the two shells, and connecting pigtails associated with said respective structures are passed outwardly centrally of said shell structures to provide external connections to the anode and cathode, said pigtail portions being sealed by means of pieces of thermoplastic material bonded internally of the shell structures.

10. An electric primary cell according to claim 2, wherein the openwork structure providing the anode consists of expanded metal selected from the group consisting of nickel, silver, copper, zinc and stainless steel, and the active coating thereon is produced by indium and bismuth deposited in succession repeatedly to build up a deposit thickness on the solid parts of the openwork structure to a thickness lying between .005 to .01″ while remaining of openwork structural form, the proportion of bismuth in the deposited material being in excess of 10%.

References Cited

UNITED STATES PATENTS

| | | | |
|---|---|---|---|
| 3,026,365 | 3/1962 | Hughes et al. | 136—120 |
| 3,236,750 | 2/1966 | Hughes et al. | 136—83 |

ALLEN B. CURTIS, *Primary Examiner.*

C. F. LE FEVOUR, *Assistant Examiner.*